(12) United States Patent
Schlüter

(10) Patent No.: US 6,711,983 B2
(45) Date of Patent: Mar. 30, 2004

(54) VACUUM BRAKE BOOSTER WITH IMPROVED MAGNET-FREE EMERGENCY BRAKE ASSISTANCE SYSTEM

(75) Inventor: Peter Schlüter, Kammerforst (DE)

(73) Assignee: Lucas Varity GmbH (DE)

( * ) Notice: Subject to any disclaimer, the term of this patent is extended or adjusted under 35 U.S.C. 154(b) by 0 days.

(21) Appl. No.: 10/231,866

(22) Filed: Aug. 29, 2002

(65) Prior Publication Data

US 2003/0010193 A1 Jan. 16, 2003

Related U.S. Application Data

(63) Continuation of application No. PCT/EP01/02092, filed on Feb. 23, 2001.

(30) Foreign Application Priority Data

Mar. 3, 2000 (DE) ......................................... 100 10 385

(51) Int. Cl.[7] .................................................. F15B 9/10
(52) U.S. Cl. ..................................................... 91/376 R
(58) Field of Search ............................... 91/376 R, 367

(56) References Cited

U.S. PATENT DOCUMENTS

| | | | |
|---|---|---|---|
| 5,483,866 | A | 1/1996 | Schluter |
| 5,493,946 | A | 2/1996 | Schluter |

(List continued on next page.)

FOREIGN PATENT DOCUMENTS

| | | |
|---|---|---|
| DE | 4405092 | 12/1994 |
| DE | 4405076 | 8/1995 |

(List continued on next page.)

OTHER PUBLICATIONS

Document Bibliography and Abstract for DE19850478 from the http://l2.espacenet.com/espacenet/viewer?PN=DE19850478&CY=ep&LG=en&DB=EPD, printed Aug. 2, 2002.

(List continued on next page.)

Primary Examiner—Edward K. Look
Assistant Examiner—Igor Kershteyn
(74) Attorney, Agent, or Firm—MacMillan, Sobanski & Todd, LLC

(57) ABSTRACT

A vacuum brake booster comprises a vacuum chamber and a working chamber which is separated in a pressure-tight manner from the latter by a mobile wall. In order to obtain a pressure difference at the mobile wall, a control valve is provided which comprises a housing coupled in a force-transmitting manner to the mobile wall and a first valve seat, which is disposed in the housing and which, in co-operation with a first valve sealing member, controls the supply of atmospheric pressure or overpressure to the working chamber in response to the displacement of an input member, which is coupled to the first valve seat, of the brake booster in order to obtain a pressure difference at the mobile wall. The first valve seat is formed at a displaceable valve member which is coupled to the input member in the actuating direction of the brake booster. The control valve comprises a second valve seat which, in co-operation with the first valve sealing member, controls a connection between the vacuum chamber and the working chamber. In order to achieve emergency brake assistance (brake assistant function), the valve member is constantly subjected to the pressure prevailing in the working chamber at its rear side, which is turned towards the input member. After the displaceable valve member has exceeded a prefixed displacement in the actuating direction relative to the control valve housing, the valve member is subjected over at least a part of its front side, which lies opposite the rear side, to the pressure prevailing in the vacuum chamber. The pressure difference then acting on the displaceable valve member holds it in the position reached until pressure equalisation between the front side and the rear side of the displaceable valve member takes place. In order to disconnect the brake assistant function, a component which is coupled to the input member in the direction opposite to the actuating direction of the brake booster acts on the first valve sealing member and lifts it off the second valve seat after a prefixed displacement of the input member.

9 Claims, 5 Drawing Sheets

U.S. PATENT DOCUMENTS

| | | | | |
|---|---|---|---|---|
| 5,711,202 A | * | 1/1998 | Tsubouchi | 91/367 |
| 6,070,514 A | * | 6/2000 | Bayens et al. | 91/367 |
| 6,425,312 B2 | * | 7/2002 | Takayama et al. | 91/367 |
| 6,557,451 B2 | * | 5/2003 | Schluter | 91/376 R |
| 2001/0027717 A1 | | 10/2001 | Schluter | |

FOREIGN PATENT DOCUMENTS

| | | |
|---|---|---|
| DE | 19824501 | 2/1999 |
| DE | 19902710 | 11/1999 |
| DE | 19831961 | 1/2000 |
| DE | 19850478 | 5/2000 |

OTHER PUBLICATIONS

Document Bibliography and Abstract for DE4405076 from the http://12.espacenet.com/espacenet/viewer?PN=DE4405076&CY=ep&LG=en&DB=EPD, printed Jul. 31, 2002.

* cited by examiner

VACUUM BRAKE BOOSTER WITH IMPROVED MAGNET-FREE EMERGENCY BRAKE ASSISTANCE SYSTEM

CROSS REFERENCE TO RELATED APPLICATIONS

This application is a continuation of International Application No. PCT/EP01/02092 filed Feb. 23, 2001, which claims priority to German Patent Application No. 10010385.5 filed Mar. 3, 2000, the disclosures of which are incorporated herein by reference.

BACKGROUND OF THE INVENTION

Vacuum brake boosters have been known for a long time, for example from DE 44 05 092 C1, and corresponding U.S. Pat. No. 5,493,946 which is incorporated by reference herein, and are used in a vast number of cases to boost the actuating forces of hydraulic vehicle brake systems and thereby maintain them at a level which is comfortable for the driver of a vehicle.

Also known from DE 44 05 092 C1 (U.S. Pat. No. 5,493,946) is a so-called brake assistant. This term is usually understood to mean a system which can make increased braking power available to a driver with substantially the same actuating force in an emergency braking situation. Systems of this kind were developed because tests revealed that, although when emergency braking most vehicle users depress the brake pedal quickly, they do not do so forcefully enough to achieve the maximum possible braking power. The stopping distance of the vehicle is therefore longer than necessary. Systems of this kind which are already in production use a brake booster adapted to be electromagnetically actuated together with a device adapted to determine the actuating speed of the brake pedal. If this device detects an actuating speed lying above a predetermined threshold value, it is assumed that an emergency braking situation exists and the brake booster is fully driven by means of the electromagnetic actuating device, i.e. it provides its maximum boost power.

DE 44 05 076 and corresponding U.S. Pat. No. 5,483,866 which is incorporated by reference herein, describes a pneumatic brake booster with electromagnetically initiated brake assistant function. If an actuating member 44 is released while a valve seat 32 formed on a valve body 40 is, by an electromagnet 40, retained in a position in which it is remote from a sealing member 60, a further valve seat 72 abuts the sealing member 60 which deactivates the brake assistant.

However, brake boosters with an electromagnetic actuation facility are too expensive for motor vehicles of the lower and middle price category. Solutions which achieve a brake assistant function at less expense are therefore required.

DE 198 24 501 A1 describes a vacuum brake booster with pneumatically controlled brake assistant function. When a brake actuating rod 28 is actuated rapidly, a pressurized chamber 52 is connected to the ambient air. As a result, a closing piston 41 is moved opposite to the direction of actuation of the brake actuating rod 28, and a third sealing seat 37 blocks the connection between the vacuum chamber 29 and the working chamber 35 even if a first sealing seat 27 is lifted off the valve body 25 due to the movement of a control housing 11. This arrangement prevents that the movement of the control housing 11 results in the boosting effect stopping already before the working chamber is completely filled with atmospheric pressure.

SUMMARY OF THE INVENTION

The object of the invention is to provide a vacuum brake booster of the above-mentioned type with a brake assistant function without having to resort to a control valve adapted to be electromagnetically actuated. At the same time, on the one hand unintentional activation of the brake assistant function is to be prevented, as far as this is possible, and on the other hand, once the brake assistant function has been initiated, it should be possible to deactivate it in a convenient and reliable manner.

According to the invention, the first valve seat is formed at a displaceable valve member which is coupled to the input member in the actuating direction of the brake booster. The displaceable valve member is always subjected to the pressure prevailing in the working chamber at its rear side, which is turned towards the input member. If, however, the displaceable valve member is displaced relative to the control valve housing in the actuating direction by more than a prefixed distance, the displaceable valve member is subjected over at least a part of its front side, which lies opposite the rear side, to the pressure prevailing in the vacuum chamber, and the pressure difference then acting on the displaceable valve member holds the valve member in the position reached until pressure equalization between the front side and the rear side of the displaceable valve member takes place. According to the invention, therefore, the pressure difference prevailing at the mobile wall at the time is used to exert a force acting on the displaceable valve member in the actuating direction in order to hold the first valve seat formed at the displaceable valve member completely open in certain situations in which the actuating force exerted by the driver is not sufficient for this, so that the brake booster builds up the greatest possible pressure difference between its vacuum chamber and its working chamber, i.e. provides its maximum boost power.

After exceeding the above-mentioned, prefixed relative displacement, the displaceable valve member of the vacuum brake booster according to the invention is therefore virtually "sucked" into a position in which the first valve seat is completely open. However, this necessary relative displacement is only achieved if the actuating speed of the input member exceeds a defined value. In the vacuum brake booster according to the invention the brake assistant function is therefore activated solely by the skilful utilization of pressure differences present within the brake booster. No magnet is required to initiate the brake assistant function.

In the vacuum brake booster according to the invention the brake assistant function is disengaged by means of a reduction in the pressure difference acting on the displaceable valve member. The reduction in this pressure difference is initiated by a return movement of the input member which exceeds a certain extent, and a component which is coupled to the input member in the direction opposite to the actuating direction of the brake booster acts on the first valve sealing member and lifts it off the second valve seat after a prefixed displacement of the input member in the direction opposite to the actuating direction. The vacuum chamber is thereby connected to the working chamber and the pressure difference acting on the displaceable valve member is reduced, which results in a reliable and convenient deactivation of the brake assistant function. The prefixed displacement ensures that the brake assistant function is not disconnected unintentionally too soon.

In a preferred embodiment of the brake booster according to the invention the component which is coupled to the input member in the direction opposite to the actuating direction of the brake booster is a fifth valve seat which is connected to a transmission piston and preferably disposed concentrically with the first valve seat and the second valve seat.

In preferred embodiments of the vacuum brake booster according to the invention the displaceable valve member is resiliently preloaded opposite to the actuating direction of the brake booster. This resilient preload advantageously ensures that the displaceable valve member is coupled to the input member in the actuating direction of the brake booster and on the other hand enables the displaceable valve member to be uncoupled from the input member when the brake assistant function is activated. In embodiments of this kind the force acting on the displaceable valve member on account of the pressure difference must be greater than the opposing spring force acting on the valve member in order to initiate the brake assistant function. This requirement can easily be complied with by appropriately dimensioning the surfaces of the valve member which are subjected to the pressure difference.

A third valve seat is preferably formed on the displaceable valve member in the vacuum brake booster according to the invention. Said third seat co-operates with a second valve sealing member which in turn co-operates with a fourth valve seat establishing a connection between the working chamber and the vacuum chamber in the open state. After the valve member has exceeded the prefixed displacement relative to the control valve housing, the third valve seat is closed and the fourth valve seat open, so that the pressure prevailing in the vacuum chamber can now act on the displaceable valve member.

In particularly preferred embodiments is the third valve seat formed on the front side of the displaceable valve member. An annular cavity is defined between the third valve seat and the fourth valve seat, both of which are preferably annular, the front end boundary of which cavity is constituted on one side by the displaceable valve member. The fourth valve seat is in particular disposed concentrically with and radially outside of the third valve seat. The annular cavity is connected to the vacuum chamber when the third valve seat is closed and the fourth valve seat open, while it is connected to the working chamber when the third valve seat is open and the fourth valve seat closed. The surface of the displaceable valve member which is located radially between the third valve seat and the fourth valve seat can thus be subjected either to the pressure in the vacuum chamber or the pressure in the working chamber.

In preferred embodiments of the brake booster according to the invention, the second valve sealing member is resiliently preloaded opposite to the actuating direction of the brake booster and can be axially displaced against this spring preload. The extent of the axial displaceability of the second valve sealing member in this case represents the switching threshold which must be overridden in order to initiate the brake assistant function. In embodiments of this kind the force resulting from the pressure difference at the displaceable valve member must be greater than the sum of the spring forces which act in the opposite direction and which preload the second valve sealing member or the displaceable valve member in order to initiate the brake assistant function.

The displaceable valve member is preferably substantially sleeve-shaped in order to achieve a space-saving construction. The first valve seat is in this case formed at the end of the valve member which is turned towards the input member, while the third valve seat is located at the opposite end of the valve member. A sleeve-shaped, displaceable valve member of this kind can be integrated into conventional control valve constructions without noticeably affecting the diameter or overall length thereof.

The input member as well is preferably resiliently preloaded opposite to the actuating direction in all embodiments of the vacuum brake booster according to the invention. When the brake is released this resilient preload returns the input member to the initial position. This resilient preloading of the input member is also used to advantage in constructional terms during its return movement to the initial position to move back the above-mentioned component which is to act on the first valve sealing member to disconnect the brake assistant function relative to the displaceable valve member.

DETAILED DESCRIPTION OF THE INVENTION

Figure 1:
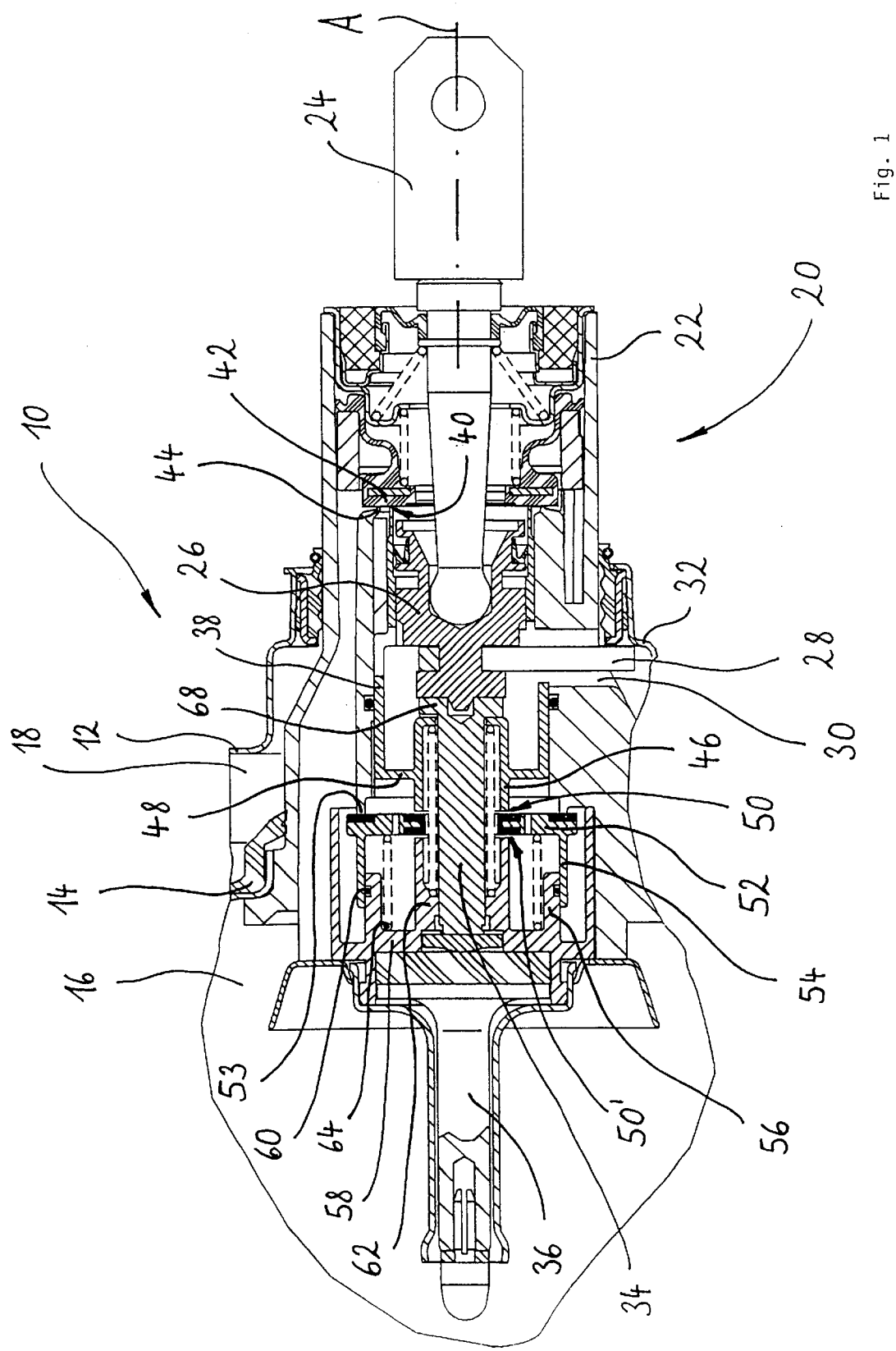
FIG. 1 is a longitudinal section through the region of interest here of a vacuum brake booster according to invention in a rest position.
Figure 2:
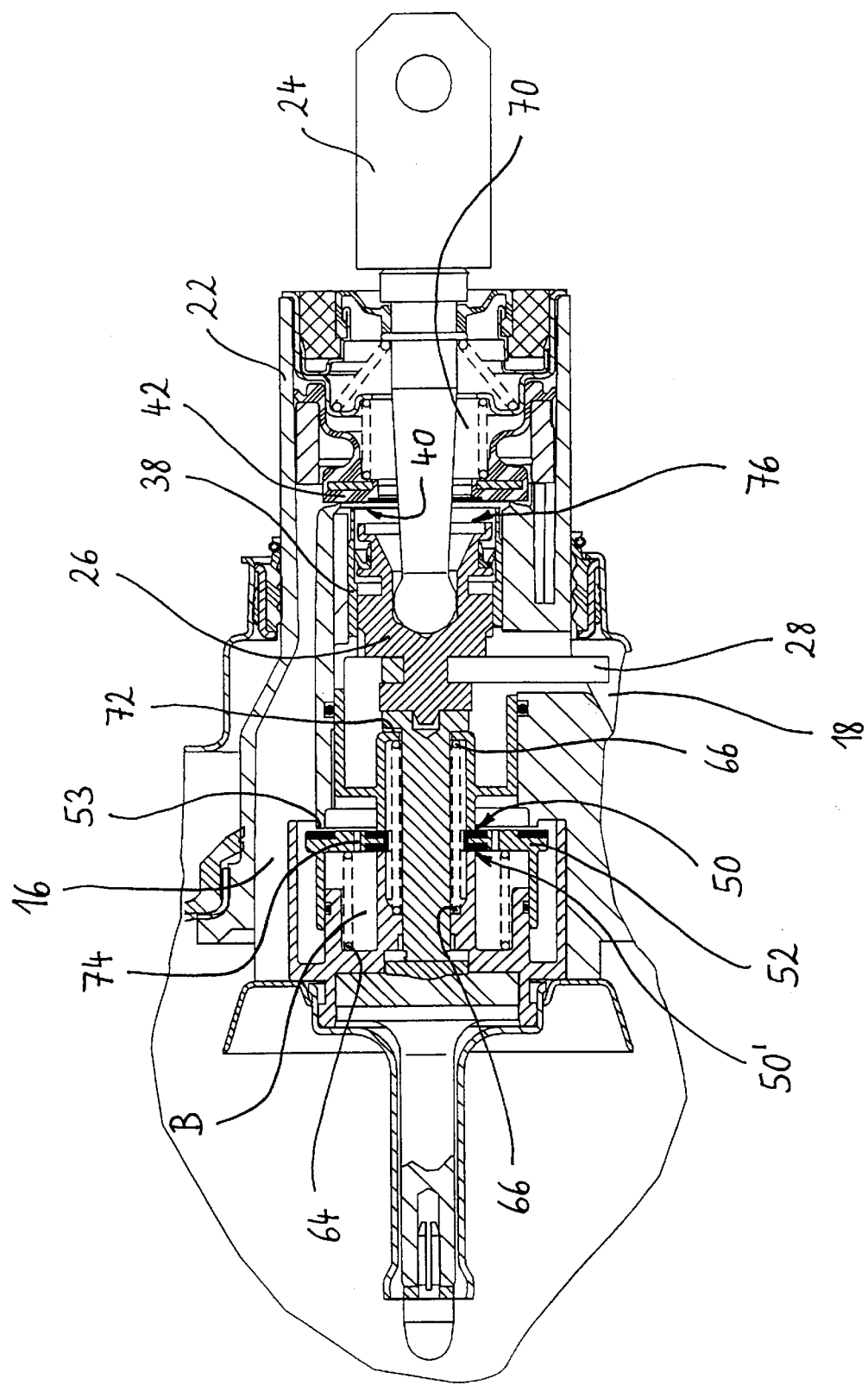
FIG. 2 is the view according to FIG. 1 in an actuating position in which a brake assistant function is activated.
Figure 3:
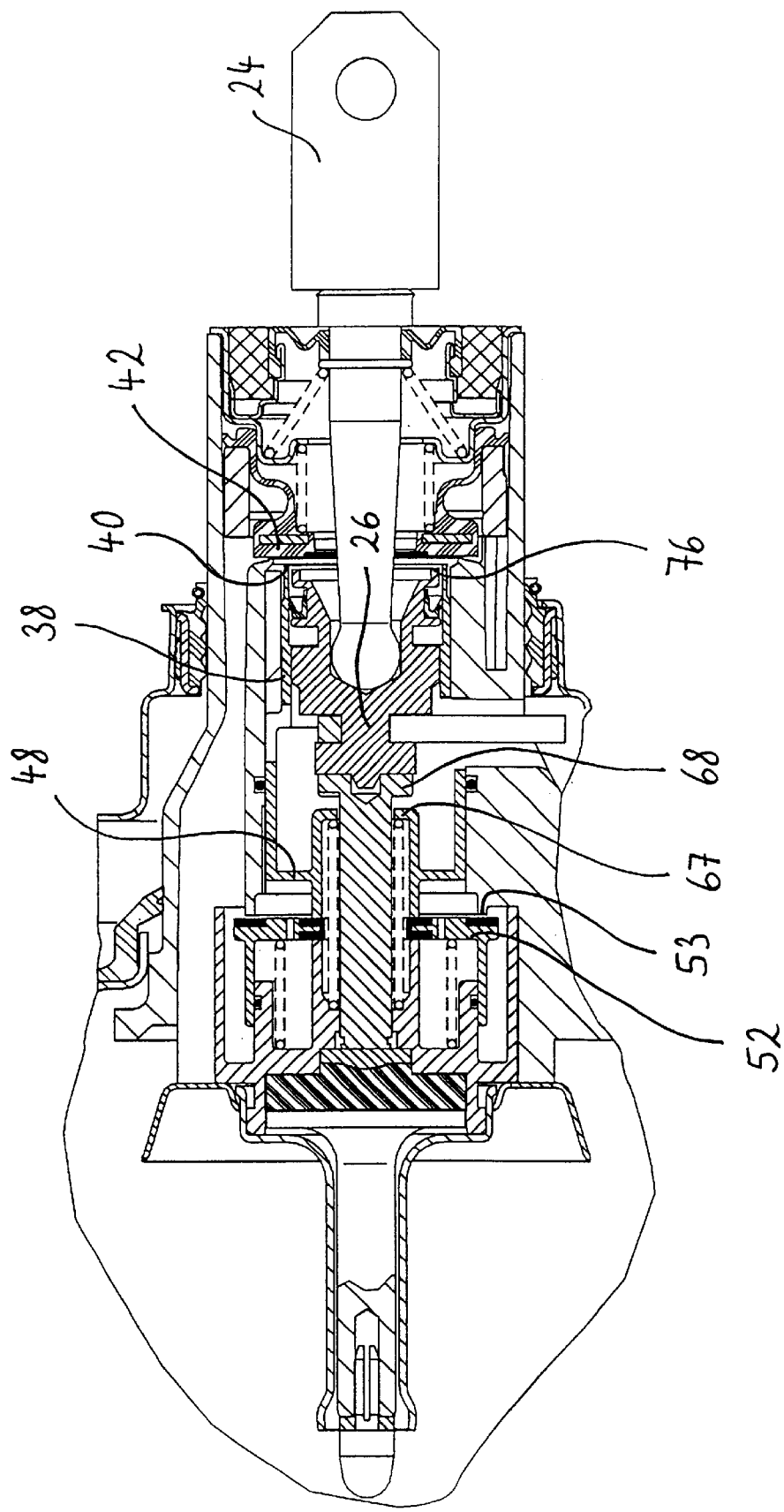
FIG. 3 is the view according to FIG. 2 with reduced actuating force.
Figure 4:
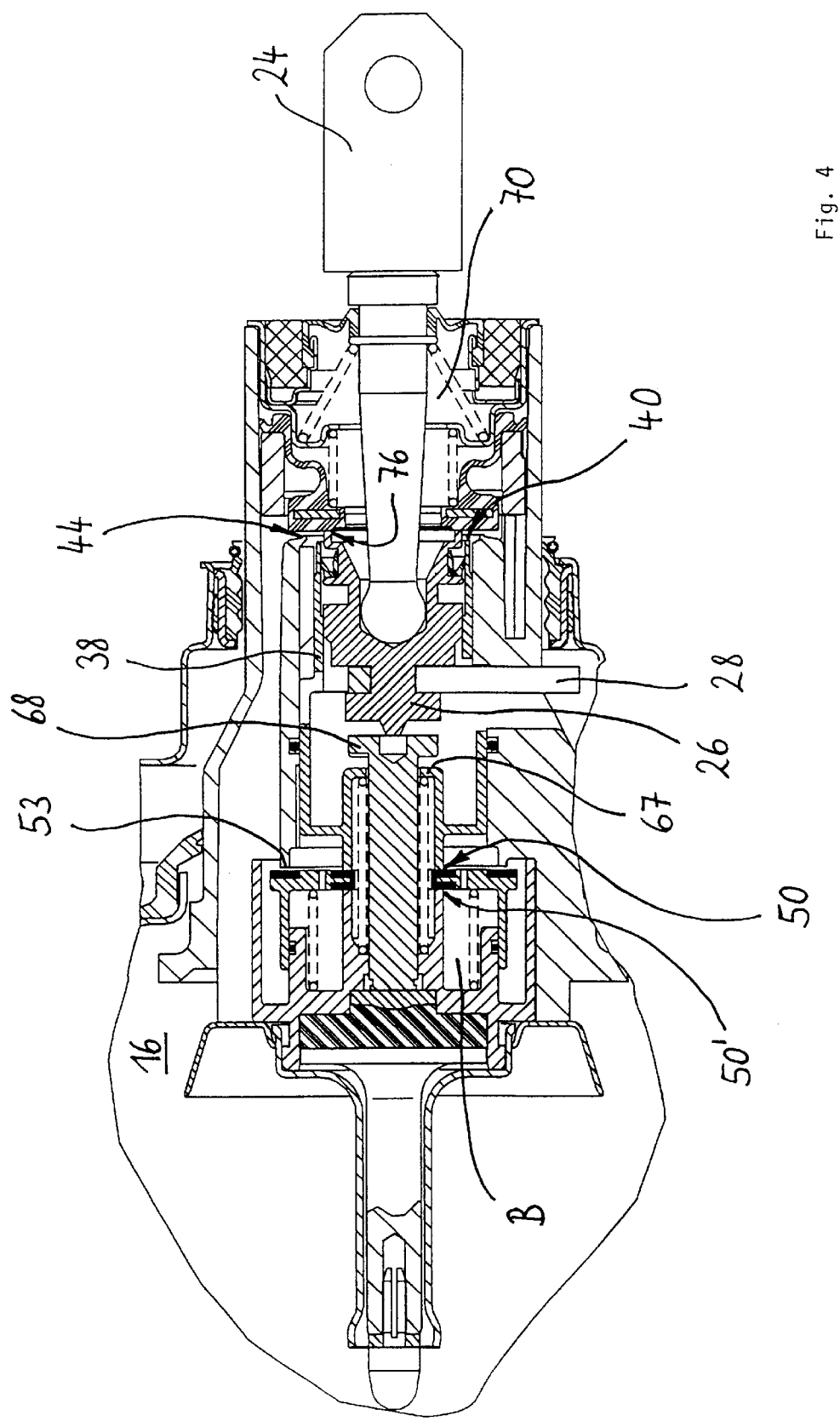
FIG. 4 is the view according to FIG. 2 with the actuating force reduced further, just before the assistant function is disconnected.
Figure 5:
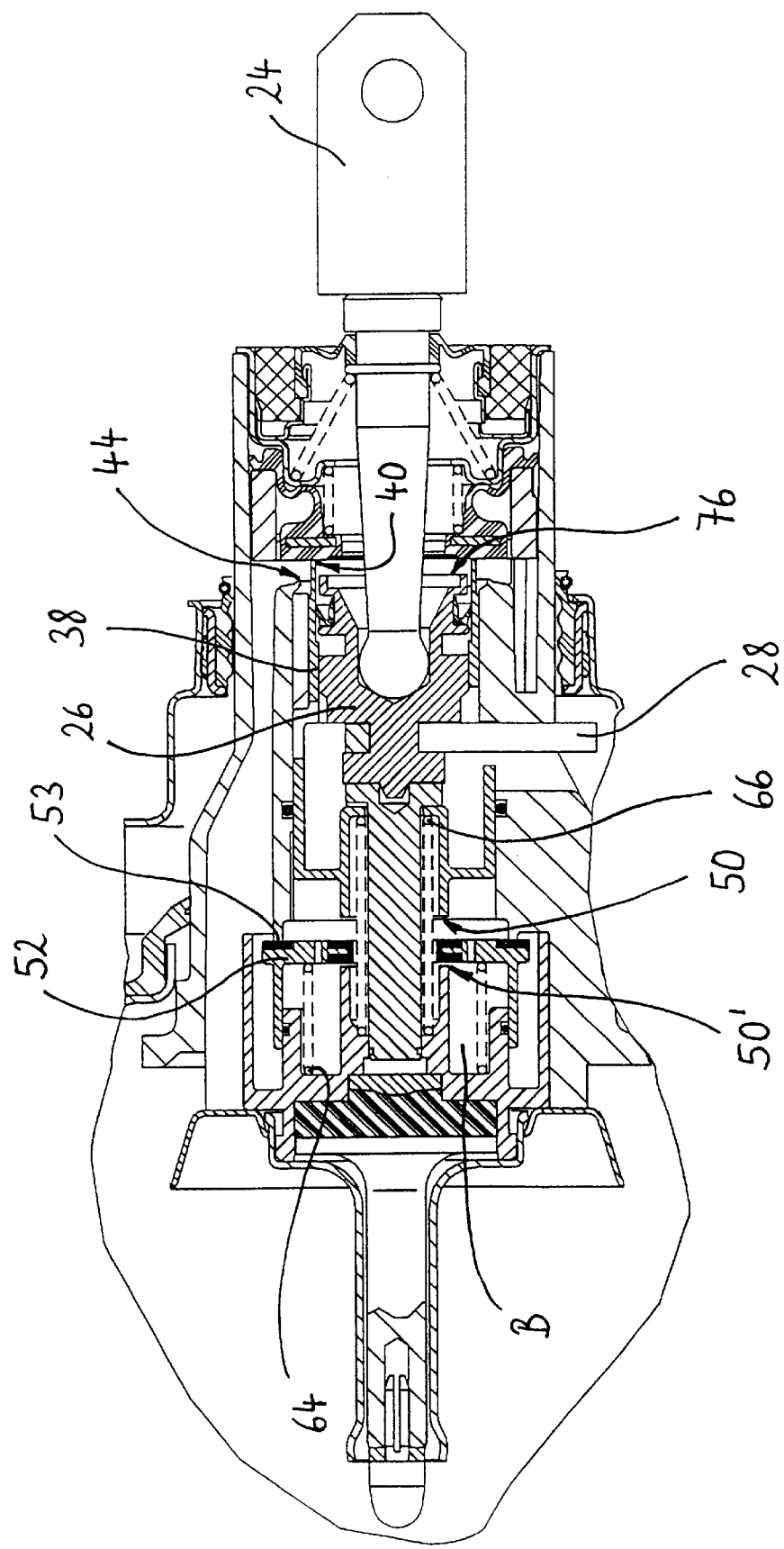
FIG. 5 is the view according to FIG. 4 following disconnection of the brake assistant function.

FIG. 1 shows a vacuum brake booster 10 with a housing 12, the interior space of which is divided by a mobile wall 14 into a vacuum chamber 16 and a working chamber 18.

The vacuum chamber 16 is constantly connected to a vacuum source, for example to the inlet duct of an internal combustion engine or to a vacuum pump, when the brake booster 10 is in operation. A control valve 20 with a housing 22 serves to establish a connection either between the vacuum chamber 16 and the working chamber 18, in order to evacuate the working chamber 18, or a connection between the evacuated working chamber 18 and the ambient atmosphere, i.e. the ambient pressure. The mobile wall 14 is coupled in a force-transmitting manner to the control valve housing 22.

The brake booster 10 is actuated by means of a rod-shaped input member 24, which is resiliently preloaded into its initial position, projects along an axis A into the control valve housing 22 and is fastened by way of its one, spherical end in a transmission piston 26.

A locking bar 28 is rigidly fastened to the transmission piston 26, extends at a right angle to the axis A away from the transmission piston 26 and through a duct 30 formed in the control valve housing 22. In the position shown in FIG. 1 the locking bar 28 lies against a stop 32 of the brake booster housing 12, which defines the rest position of the control valve 20, i.e. the position of all the components of the control valve 20 relative to one another which they take up when the brake booster 10 is not actuated (LTF position). The side walls of the duct 30 limit the mobility of the locking bar 28 along the axis A, i.e. the maximum travel of the locking bar 28 along the axis A is determined by the axial spacing of the side walls of the duct 30 from each other.

The end of the transmission piston 26 located opposite the spherical end of the input member 24 lies against an actuating piston 34 transmitting an actuating force introduced via the input member 26 into the brake booster 10 to a force delivery ram 36, which delivers the force to a master cylinder, that is connected downstream of the brake booster but not shown here, of a hydraulic vehicle brake system.

The transmission piston 26 and a part of the actuating piston 34 are surrounded by a displaceable valve member 38, which is disposed concentrically with them and is substantially sleeve-shaped. A first annular valve seat 40 of the control valve 20 is formed on the free end of the valve member 38, located adjacent the input member 24. The first valve seat 40 co-operates with a first valve sealing member 42, which is resiliently preloaded against it and is likewise annular, and can control the connection between the ambient atmosphere and the working chamber 18 of the brake booster 10.

A second annular valve seat 44 of the control valve 20 is formed inside the control valve housing 22 radially outside of the first valve seat 40 and concentrically with the latter, and likewise co-operates with the first valve sealing member 42. This second valve seat 44 is adapted to control the connection between the vacuum chamber 16 and the working chamber 18 of the brake booster 10 in order to evacuate the working chamber 18 again after the brake booster has been actuated.

A third annular valve seat 50 is formed at the free end of a sleeve 46, which has a smaller diameter than the valve member 38 and is integrally connected to the valve member 38 via an annular flange 48, at the end of the displaceable valve member 38 which is remote from the input member 24. Said valve seat 50 co-operates with a second valve sealing member 52, which is resiliently preloaded against it and is likewise annular.

A fourth valve seat 53, again annular, is formed at the control valve housing 22 radially outside of the third valve seat 50 and is disposed concentrically with the latter and likewise co-operates with the second valve sealing member 52. The function of both the third valve seat 50 and the fourth valve seat 53 shall be explained in detail in the following.

The second valve sealing member 52 is guided in an axially displaceable manner by means of a cylindrical prolongation 54, which extends from the member 52 in the direction of the force delivery ram 36, on a correspondingly designed section 56 of an auxiliary housing 58 and sealed off from the section 56 by a seal 60. The auxiliary housing 58, which is inserted in the inner end region of the control valve housing 22 and firmly connected to the latter, comprises a hollow cylindrical prolongation 62, which projects into the control valve housing 22 and has a smaller outside diameter than the section 56, which is disposed concentrically with it and is likewise of a hollow cylindrical shape. The end of the actuating piston 34 which is turned towards the force delivery ram 36 is accommodated in the hollow cylindrical prolongation 62. An annular valve seat 50' is formed at the free end of the hollow cylindrical prolongation 62, which seat is of the same diameter as the third valve seat 50 with which it forms a functional unit in this embodiment. The valve seat 50' co-operates with the second valve sealing member 52 on the side of the latter which is remote from the third valve seat 50.

A compression spring 64 is disposed between the hollow cylindrical prolongation 62 and the section 56, said spring being supported on one side at the bottom of the auxiliary housing 58 and on the other, opposite side at the second valve sealing member 52. The compression spring 64 preloads the second valve sealing member 52 opposite to the actuating direction of the brake booster 10 and in the direction of the third valve seat 50 and the fourth valve seat 53.

A further compression spring 66, which concentrically surrounds the actuating piston 34 and is supported by way of one end at the auxiliary housing 58, presses with its other end against a radially inwardly directed, uninterrupted collar 67 of the sleeve 46 of the displaceable valve member 38, so that the valve member 38 is preloaded opposite to the actuating direction of the brake booster 10 and is normally held in contact with an annular collar 68 formed on the actuating piston 34.

The function of the represented brake booster 10 is now explained in detail on the basis of FIGS. 1 to 5. Actuation of the brake booster 10 displaces the input member 24 into the brake booster 10 or into its control valve 20, i.e. to the left in the figures. This displacement of the input member 24 is transmitted to the transmission piston 26 and from the latter to the actuating piston 34. The actuating piston 34 in turn transmits this displacement to the displaceable valve member 38 by means of the annular collar 68 formed on it, so that the first valve seat 40 is lifted off the first valve sealing member 42, whereby ambient air can flow through a duct 70 surrounding the input member 24, past the open first valve seat 40 and further through the duct 30 into the working chamber 18 of the brake booster 10. A pressure difference is as a result produced at the mobile wall 14, and the resulting force is transmitted from the mobile wall 14 to the control valve housing 22, which delivers the force via the force delivery ram 36 to the above-mentioned master cylinder (not illustrated).

Because the displaceable valve member 38 is coupled to the input member 24 in the actuating direction of the brake booster as described, the first valve seat 40 of the control valve 20 is opened to a greater or lesser degree in accordance with the displacement of the input member 24 relative to the control valve housing 22. A corresponding assisting force of the brake booster 10 results from the pressure difference acting at the mobile wall 14 at the time.

Where conventional service braking is concerned, which here is called normal braking, the input member 24 and therefore also the displaceable valve member 38 are only displaced over a relatively short distance in the actuating direction. As a result, although the third valve seat 50 is applied to the second valve sealing member 52 during normal braking of this kind, the valve seat 50' co-operating with it is not. There is no appreciable axial displacement of the second valve sealing member 52, so that the fourth valve seat 53 remains closed. When normal braking takes place, the pressure prevailing in the working chamber 18 therefore acts both at the rear side and at the front side of the annular flange 48 of the valve member 38 via a duct 72 formed at the annular collar 68 (see FIG. 2) and via the valve seat 50' then open and pressure equalizing openings 74 which are provided in the second valve sealing member 52. Therefore no pressure difference is operative at the displaceable valve member 38 and, in particular, at its annular flange 48 during normal braking.

If an actuating force applied to the input member 26 during normal braking is not increased, the first valve sealing member 42 again comes into contact with the first valve seat 40 on account of the displacement of the control valve housing 22, which is brought about by the pressure difference applied to the mobile wall 14, so that the air supply into the working chamber 18 is interrupted (state of equilibrium, both valve seats 40 and 44 closed).

If, however, the input member 24 is actuated rapidly and so that it travels relatively far, as is typical of panic braking (emergency braking), the displaceable valve member 38 is displaced relative to the control valve housing 22 in the actuating direction so that both the axial spacing between the third valve seat 50 and the second valve sealing member 52 and the axial spacing between the valve seat 50' and the second valve sealing member 52 are covered virtually instantaneously. Considering the process in greater detail, the third valve seat 50 is firstly applied in sealing fashion to the second valve sealing member 52 and then displaces this against the force of the compression spring 64 in the actuating direction, so that also the valve seat 50' comes into sealing contact with the second valve sealing member 52. This displacement of the second valve sealing member 52 opens the fourth valve seat 53, so that the vacuum in the vacuum chamber 16 can enter the annular cavity B defined between the closed valve seats 50, 50' and the fourth valve seat 53. After the valve seat 53 has opened, the pressure in the annular cavity B reaches that of the vacuum chamber relatively quickly and then acts on the front side of the annular flange 48 of the valve member 38.

However, the pressure prevailing in the working chamber 18 acts as before on the rear side of the annular flange 48. The pressure difference therefore applied to the annular flange 48 results in a force which acts on the displaceable valve member 38 in the actuating direction and which, through appropriately dimensioning the surface of the annular flange 48, is greater than the opposing force of the two compression springs 64 and 66. This ensures that the displaceable valve member 38 is held in the position illustrated in FIG. 2, i.e. the first valve seat 40 remains open (brake assistant function active, see FIG. 2), even if the input member 24 is displaced slightly opposite to the actuating direction in the further course of the emergency braking action (see FIG. 3, gap between annular collar 68 and collar 67 of the sleeve 46). Because of the vacuum in the annular cavity B in this operating state, the displaceable valve member 38 remains "stuck by suction", as it were, to the second valve sealing member 52, even when the annular collar 68 detaches itself from the collar 67 of the sleeve 46.

Pressure equalization relative to the annular flange 48 must take place in order to disconnect the brake assistant function. A fifth valve seat 76 is provided for this purpose which in the embodiment shown is integral with the transmission piston 26 having an annular shape and being disposed concentrically with the first valve seat 40 and the second valve seat 44., Following a prefixed displacement of the input member 24 opposite to the actuating direction, i.e. to the right in the figures, the fifth valve seat 76 comes into contact with the first valve sealing member 42 and then lifts it off the second valve seat 44 (see FIG. 4). On the one hand this interrupts the connection between the working chamber 18 and atmospheric pressure and on the other opens the connection between the vacuum chamber 16 and the working chamber 18, resulting in a reduction of the pressure, which is an overpressure relative to the vacuum chamber 16, in the working chamber 18. A fluid connection therefore now exists between the interior space of the displaceable valve member 38 and the annular cavity B so that the above-mentioned pressure equalization can take place.

Once the pressure equalization has been carried out, the force in the actuating direction resulting from the pressure difference at the annular flange 48 ceases, so that the compression spring 64 moves the second valve sealing member 52 into contact with the fourth valve seat 53 and the compression spring 66 presses the displaceable valve member 38 into contact with the annular collar 68 of the actuating piston 34. The brake assistant function is therefore disconnected and the valve seats 50 and 50' are again open. The valve member 38 is displaced back to the right (see FIG. 5). In the course of this displacement, the first valve seat 40 is applied to the first valve sealing member 42 and, as from this time, takes over from the fifth valve seat 76 the function of interrupting the connection between the working chamber 18 and the atmosphere.

The fifth valve seat 76, which is coupled to the return movement of the input member 24, therefore always enables the brake booster power to be reduced, even if the displaceable valve member 38 were to remain at some point in the activated brake assistant function position. Although in the illustrated embodiment the above-mentioned fifth valve seat 76 causes the brake assistant function to be disconnected, this function can virtually be undertaken by any part which is coupled to the return movement of the input member 24 and acts on the first valve sealing member 42 following a prefixed displacement in the direction opposite to the actuating direction.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vacuum brake booster comprising
   a vacuum chamber and a working chamber, which is separated in a pressure-tight manner from the latter by a mobile wall, and
   a control valve, which comprises a housing coupled in a force-transmitting manner to the mobile wall and a first valve seat, which is disposed in the housing and which, in co-operation with a first valve sealing member, controls the supply of atmospheric pressure or pressure above atomspheric to the working chamber in accordance with the displacement of an input member, which is coupled to the first valve seat, of the brake booster in order to obtain a pressure difference at the mobile wall, wherein the first valve seat is formed at a displaceable valve member which is coupled to the input member in the actuating direction of the brake booster and comprises a second valve seat which, in co-operation with the first valve sealing member, controls a connection between the vacuum chamber and the working chamber, wherein
   the valve member is subjected to the pressure prevailing in the working chamber at its rear side, which is turned towards the input member,
   after the displaceable valve member has exceeded a prefixed displacement in the actuating direction relative to the control valve housing, the valve member is subjected over at least a part of its front side, which lies opposite the rear side, to the pressure prevailing in the vacuum chamber, wherein the pressure difference then acting on the displaceable valve member to hold it in the position which is reached until pressure equalization between the front side and the rear side of the displaceable valve member takes place, and that
   a component which is coupled to the input member in the direction opposite to the actuating direction of the brake booster acts on the first valve sealing member and lifts it off the second valve seat after a prefixed displacement of the input member opposite to the actuating direction.

2. The vacuum brake booster according to claim 1, wherein the component which is coupled to the input member in the direction opposite to the actuating direction of the brake booster is a fifth valve seat connected to a transmission piston.

3. The vacuum brake booster according to claim 2, wherein the fifth valve seat is disposed concentrically with the first valve seat and the second valve seat.

4. The vacuum brake booster according to claim 1, wherein the displaceable valve member is resiliently preloaded opposite to the actuating direction of the brake booster.

5. The vacuum brake booster according to claim 1, wherein a third valve seat is formed at the displaceable valve member, which seat co-operates with a second valve sealing member which in turn co-operates with a fourth valve seat establishing a connection between the working chamber and the vacuum chamber in the open state, and that after the valve member has exceeded the prefixed displacement relative to the control valve housing, the third valve seat is closed and the fourth valve seat is open.

6. The vacuum brake booster according to claim 5, wherein an annular cavity is defined between the third valve seat and the fourth valve seat, the front end boundary of which cavity is constituted by one side by the displaceable valve member, and that the annular cavity is connected to the vacuum chamber when the third valve seat is closed and the fourth valve seat open and to the working chamber when the third valve seat is open and the fourth valve seat closed.

7. The vacuum brake booster according to claim 5, wherein the second valve sealing member is resiliently preloaded opposite to the actuating direction of the brake booster and can be axially displaced against this spring preload.

8. The vacuum brake booster according to claim 1, wherein the displaceable valve member is substantially sleeve-shaped, wherein the first valve seat is formed at the end of the valve member which is turned towards the input member and the third valve seat is formed at the opposite end of the valve member.

9. The vacuum brake booster according to claim 1, wherein the input member is resiliently preloaded opposite to the actuating direction.

* * * * *